US007580430B2

(12) United States Patent
Jang

(10) Patent No.: US 7,580,430 B2
(45) Date of Patent: Aug. 25, 2009

(54) METHOD FOR ENCODING VIDEO CALL DATA FOR MOBILE COMMUNICATION TERMINAL

(75) Inventor: Sung-Bong Jang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 689 days.

(21) Appl. No.: 11/264,614

(22) Filed: Oct. 31, 2005

(65) Prior Publication Data

US 2006/0092987 A1  May 4, 2006

(30) Foreign Application Priority Data

Nov. 2, 2004  (KR)  ...................... 10-2004-0088329

(51) Int. Cl.
*H04J 3/02* (2006.01)
(52) U.S. Cl. ..................................... 370/537
(58) Field of Classification Search ........................ None
See application file for complete search history.

(56) References Cited

U.S. PATENT DOCUMENTS

| 6,233,251 | B1 * | 5/2001 | Kurobe et al. ............... 370/471 |
| 6,317,437 | B1 | 11/2001 | Park et al. | |
| 6,907,067 | B1 * | 6/2005 | Moeller et al. ......... 375/240.01 |
| 6,930,618 | B2 * | 8/2005 | Touyama et al. ............... 341/51 |
| 2003/0043749 | A1 | 3/2003 | Tanaka et al. | |

FOREIGN PATENT DOCUMENTS

| EP | 0-833-471 A1 | 4/1998 |
| GB | 2365713 A | 2/2002 |
| JP | 09-312626 | 2/1997 |
| JP | 09-116572 | 5/1997 |
| JP | 10-234010 | 9/1998 |
| JP | 11-331222 | 11/1999 |
| JP | 2002-026980 | 1/2002 |

OTHER PUBLICATIONS

Brunt et al, Data Multiplexing Strategies for Mobile Applications, IEEE, 5 pages, 2000.*
Tye et al, DSP Implementation of Very Low Bit Rate Videoconferencing System, IEEE, 4 pages, 1997.*
International Telecommunication Union ITU: "Series H: Audiovisual and Multimedia System: Infrastructure of Audiovisual Services—Communication Procedures. Control protocol for multimedia communication. ITU-T Recommendation H.245 (Jul. 2003)." ITU-T Recommendation, 'Online! Jul. 14, 2003 , XP002369895, Geneva, Retrieved from the Internet: URL:http://mirror.itu.int/dms/pay/it-t/rec/h/T-REC-H.245-200307-S PDF-E.pdf> retrieved on Feb. 21, 2006!

(Continued)

*Primary Examiner*—Frank Duong
(74) *Attorney, Agent, or Firm*—Lee, Hong, Degerman, Kang & Waimey

(57) ABSTRACT

A mobile communication terminal for supporting video calling, and a method for performing a video call by efficiently encoding data and transmitting the data. The method comprises constructing a multiplex code table having a plurality of multiplex codes for multiplexing data, selecting an optimum multiplex code among the plurality of multiplex codes of the multiplex table, encoding data to be transmitted by the selected multiplex code, and transmitting the encoded data. Accordingly, a synchronization inconsistency between audio data and video data can be decreased, and a network state can be maintained as an optimum state.

21 Claims, 4 Drawing Sheets

OTHER PUBLICATIONS

International Telecommunication Union ITU: "Series H: Audiovisual and Multimedia Systems: Infrastructure of audiovisual services—Transmission multiplexing and synchchronization. Multiplexing protocol for low bit rate multimedia communication. ITU-T Recommendation H.223" ITU Recommendation, 'Online! Jul. 2001, XP002369896, Geneva, Retrieved from the Internet: UEL:http://mirror.itu.int/dms/pay/itu-t/rec/h/T-REC-H.223-200107-l PDF-E.pdf> retrieved on Feb. 21, 2006!

Lindbergh, Picture Tel Corporation, "The H.324 Multimedia Communication Standard," XP000636453.

* cited by examiner ent from the following detailed description of the present

METHOD FOR ENCODING VIDEO CALL DATA FOR MOBILE COMMUNICATION TERMINAL

CROSS REFERENCE TO RELATED APPLICATIONS

Pursuant to 35 U.S.C. § 119(a), this application claims the benefit of earlier filing date and right of priority to Korean Application No. 88329/2004, filed on Nov. 2, 2004, the contents of which are hereby incorporated by reference herein in their entirety.

BACKGROUND OF THE INVENTION

1. Field of the Invention

The present invention relates to a mobile communication terminal to support video calling, and more particularly, to a method for encoding video call data capable of efficient data encoding.

2. Description of the Background Art

A protocol for multiplexing audio data, control data, and video data when performing video calling using a mobile communication device (e.g. a mobile communication terminal for supporting Wideband Code Division Multiple Access (WCDMA)) includes H.223. The H.223 protocol was proposed by the International Telecommunications Union—Telecommunication Standardization Sector (ITU-T). This protocol comprises an adaptation layer for detecting an error and restoring the detected error, and a multiplex layer for forming audio data and video data as one data unit. The multiplex layer reconstructs data with a certain ratio by using a multiplex code formed for H.245 signaling with reference to a multiplex code table, and then transmits the data to a network (Fixed Multiplex Code Selection).

FIG. 1 shows an exemplary view of a method for encoding video call data for a mobile communication terminal in accordance with the related art.

A mechanism for selecting a code from a multiplex code table for encoding data will be explained. In the related art, a code selection was performed by two WCDMA mobile terminals under a fixed selection mechanism. Referring to FIG. 1, a fifth multiplex code is selected from the multiplex code table by a mobile communication terminal according to the H.245 signaling. The fifth multiplex code of the multiplex table indicates the sequentially encoding of voice data (LCN1) of 4 bytes (RC4), control data (LCN2) of 1 byte (RC1), and video data (LCN3) of 2 bytes (RC2).

Accordingly, when substantially inputted data includes voice data of 4 bytes, control data of 3 bytes, and video data of 3 bytes, the voice data of 4 bytes is loaded, then the control data of 1 byte is loaded, and then the video data of 2 bytes is loaded. Next, the control data of 1 byte is loaded, and the video data of 1 byte is loaded. Then, the remaining 1 byte of the control data is loaded into a next packet.

However, the related art method for encoding video call data has a problem that an amount of data is not controlled according to a state of a wireless network. That is, in the related art method, enhancing a data quality by maintaining the wireless network as an optimum state by decreasing the amount of data when the wireless network is not in an optimum state and by increasing the amount of data when the wireless network is in an optimum state can not be performed.

Also, in case of using the H.223 protocol, a data bias phenomenon in which only one type of data, either audio or video, is transmitted at a specific time point in time is generated, and thus the audio data and the video data are not consistent with each other. That is, the audio data and the video data can not be re-adjusted into a proper ratio. Therefore, when either the audio data and the video data is transmitted, the synchronization between the audio data and the video data is inconsistent with each other. For instance, during video reproduction (playback), the images of a person who appears to be speaking may not match the audio being reproduced, namely, the person's lips and his voice may not correspond with each other.

BRIEF DESCRIPTION OF THE INVENTION

Therefore, an object of the present invention is to provide a method for encoding video call data capable of efficiently encoding data according to a state of a wireless network and capable of enabling audio data and video data to be consistent to each other.

To achieve these and other advantages and in accordance with the purpose of the present invention, as embodied and broadly described herein, there is provided a method for encoding video call data, comprising: constructing a multiplex code table having a plurality of multiplex codes for multiplexing data; selecting an optimum multiplex code among the plurality of multiplex codes provided at the multiplex code table; encoding data to be transmitted by the selected multiplex code; and transmitting the encoded data.

To achieve these and other advantages and in accordance with the purpose of the present invention, as embodied and broadly described herein, there is also provided a mobile communication terminal, comprising: a generation module for generating a multiplex code table having a plurality of multiplex codes for multiplexing data; a selection module for selecting an optimum multiplex code among the plurality of multiplex codes provided in the multiplex code table; an encoding module for encoding data to be transmitted by the selected optimum multiplex code; and a processor for executing each of the modules.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 2:
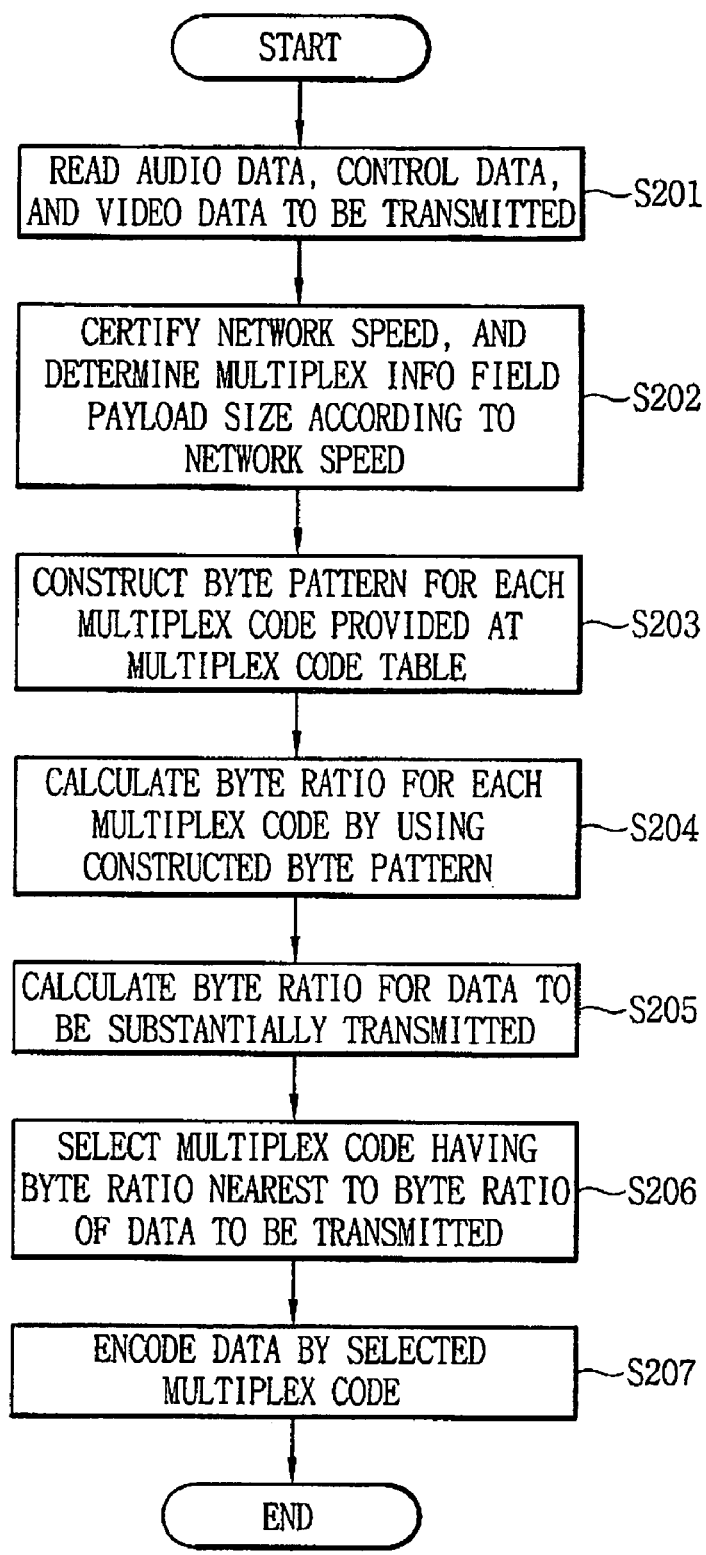
FIG. 2 is a flowchart showing an exemplary method for encoding video call data for a mobile communication terminal according to a first embodiment of the present invention.

FIG. 2 is a flowchart showing an exemplary method for encoding video call data for a mobile communication terminal according to a first embodiment of the present invention.

As shown, a multiplex code table having a plurality of multiplex codes for multiplexing data can be constructed, and then audio data, control data, and video data to be transmitted are read (S201). Then, a payload size of a multiplex info field for the audio data, the control data, and the video data can be determined according to a network speed (i.e., data transfer rate) (S202). Next, a byte pattern table for the multiplex codes of the multiplex table can be constructed (S203). Then, a byte ratio for each multiplex code of the multiplex code table can be calculated by using the byte pattern table (S204). Next, a byte ratio for the audio data, the control data, and the video data to be transmitted can be calculated (S205), and then a multiplex code having a nearest byte ratio to the calculated byte ratio can be selected from the multiplex codes of the multiplex table (S206). Finally, the audio data, the control data, and the video data to be transmitted can be encoded by using the multiplex code selected from the multiplex codes of the multiplex code table (S207). A network speed (i.e., data transfer rate) for a channel connected to a base station at the time of an audio calling can be certified by a signal transmitted from the base station, and a payload size according to the network speed can be determined by a manufacturing company for the mobile communication terminal or a mobile communication provider.

A following table 1 shows one example of a fifth multiplex code of a multiplex code table for H.245 signaling.

TABLE 1

| Multiplex Code 0 | {LCN0, RC UCF} |
| Multiplex Code 1 | {LCN1, RC UCF} |
| Multiplex Code 2 | {LCN2, RC UCF} |
| Multiplex Code 3 | {{LCN1, RC2}, {LCN2 RC1}, RC UCF} |
| Multiplex Code 4 | {LCN2, RC20}, {LCN1, RC UCF} |

The LCN0 denotes audio data, the LCN1 denotes control data, and the LCN2 denotes video data. Also, the RC1 denotes one byte, and the RC2 denotes two bytes.

The method for encoding video call data according to the present invention will be explained under an assumption that substantially inputted data includes audio data of 0 bytes, control data of 6 bytes, and video data of 2722 bytes.

When a user is to perform a video call by using his mobile terminal, the substantially inputted data is read, and a state of a channel connected to a base station (e.g., network speed, data transfer rate, etc.) is certified. The state of the channel connected to the base station can be judged by a certain signal transmitted from the base station.

When the network speed has been judged, a payload size of a multiplex info field according to the network speed is determined.

Then, a byte pattern table for each multiplex code of the multiplex code table shown in Table 1 can be constructed. The byte pattern table can be constructed by allocating bytes to each channel according to each pattern of the multiplex codes of the multiplex table. If an information size of a multiplex protocol data unit (PDU) is supposed to be 64 bytes, a byte pattern table for the information size may be as follows.

Byte_Pattern[0][0]=64; Byte_Pattern[0][1]=0; Byte_Pattern[0][2]=0;

Byte_Pattern[1][0]=0; Byte_Pattern[1][1]=64; Byte_Pattern[1][2]=0;

Byte_Pattern[2][0]=0; Byte_Pattern[2][1]=0; Byte_Pattern[2][2]=64;

Byte_Pattern[3][0]=0; Byte_Pattern[3][1]=43; Byte_Pattern[3][2]=21;

Byte_Pattern[4][0]=0; Byte_Pattern[4][1]=44; Byte_Pattern[4][2]=20;

When the byte pattern table for Table 1 has been constructed, a byte ratio for each of the multiplex codes of the multiplex table can be constructed by using the constructed byte pattern table.

The byte ratio is calculated by dividing a byte pattern value by an information size of a multiplex PDU, and byte ratios for the multiplex codes shown in Table 1 can be as follows.

Multiplex code 0
Byte_Ratio[0][0]=Byte_Pattern[0][0]/64=64/64=1.0;
Byte_Ratio[0][1]=Byte_Pattern[0][1]/64=0/64=0.0;
Byte_Ratio[0][2]=Byte_Pattern[0][2]/64=0/64=0.0

Multiplex code 1
Byte_Ratio[1][0]=Byte_Pattern[1][0]/64=0/64=0.0;
Byte_Ratio[1][1]=Byte_Pattern[1][1]/64=64/64=1.0;
Byte_Ratio[1][2]=Byte_Pattern[1][2]/64=0/64=0.0

Multiplex code 2
Byte_Ratio[2][0]=Byte_Pattern[2][0]/64=0/64=0.0;
Byte_Ratio[2][1]=Byte_Pattern[2][1]/64=0/64=0.0;
Byte_Ratio[2][2]=Byte_Pattern[2][2]/64=64/64=1.0

Multiplex code 3
Byte_Ratio[3][0]=Byte_Pattern[3][0]/64=0/64=0.0;
Byte_Ratio[3][1]=Byte_Pattern[3][1]/64=43/64=0.67;
Byte_Ratio[3][2]=Byte_Pattern[3][2]/64=21/64=0.32

Multiplex code 4
Byte_Ratio[4][0]=Byte_Pattern[4][0]/64=0/64=0.0;
Byte_Ratio[4][1]=Byte_Pattern[4][1]/64=44/64=0.68;
Byte_Ratio[4][2]=Byte_Pattern[4][2]/64=20/64=0.31

After the byte ratio for each of the multiplex codes is constructed, a byte ratio for the substantially inputted data, that is, the audio data (LCN0) of 0 byte, the control data (LCN1) of 6 bytes, and the video data (LCN2) of 2722 bytes can be calculated.

LCN0_byte_ratio=0/2728=0.0;
LCN1_byte_ratio=6/2728=0.002;
LCN2_byte_ratio=6/2728=0.998

Then, a multiplex code having a nearest byte ratio to the determined byte ratio for the substantially inputted data can be selected from the multiplex codes of the multiplex table. That is, a difference value between the byte ratio for each of the substantially inputted data and the byte ratio for each of the multiplex codes of the multiplex code table can be calculated. Then, a multiplex code having a smallest difference value can be selected among the multiplex codes. The multiplex code having a smallest difference value can be determined by multiplying the difference value by a finite number. This multiplication may be performed in case that numbers below decimal point are complicated to calculate. Also, the byte ratio for the substantially inputted data can be respectively compared with each byte ratio for the multiplex codes by being rounded up to the nearest integer or by being rounded off.

Since the audio data, the control data, and the video data to be substantially transmitted may have a byte ratio of 0:0.002: 0.998, the second multiplex code is selected from the multiplex code table. That is, since a difference value between the second multiplex code having a byte ratio of 0:0:1 and the substantial data is the smallest, input data to be substantially transmitted is encoded by the second multiplex code.

Figure 3:
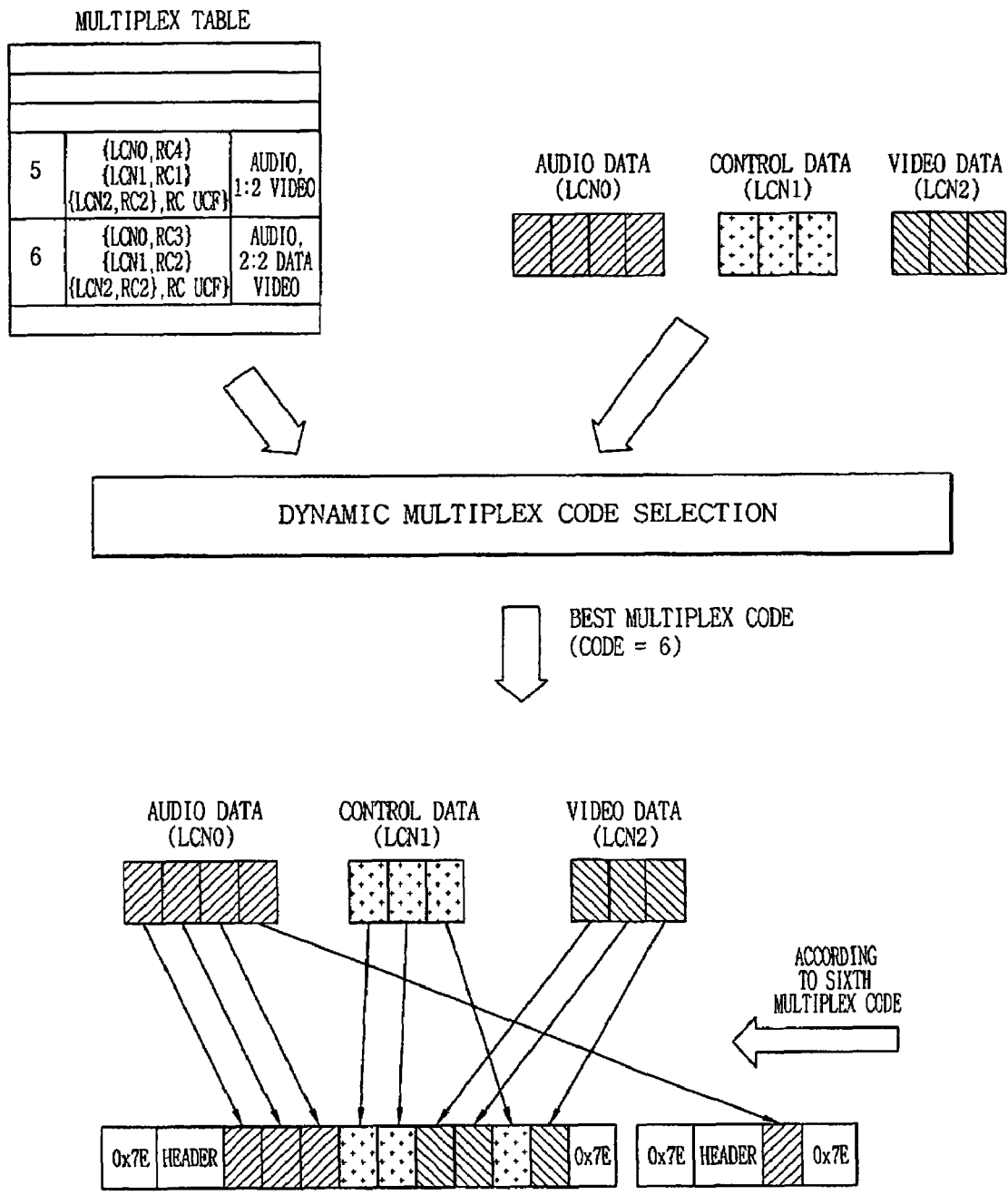
FIG. 3 shows an exemplary view of a method for encoding video call data for a mobile communication terminal according to the present invention.

FIG. 3 shows an exemplary view of a method for substantially encoding video call data after an optimum multiplex code is selected.

As shown, a sixth multiplex code is selected as an optimum multiplex code, and thus data is encoded by the sixth multiplex code. That is, when compared with the byte ratio of data to be substantially transmitted, the sixth multiplex code among the multiplex codes provided at the multiplex rate table has the nearest byte rate thereto. Therefore, data to be substantially inputted is encoded by the sixth multiplex code.

For example, referring to FIG. 3, when the audio data (LCN0) has 4 bytes, the control data (LCN1) has 3 bytes, and the video data (LCN2) has 3 bytes, then 3 bytes (RC3) of the audio data, 2 bytes (RC2) of the control data, and 2 bytes (RC2) of the video data are sequentially loaded to a field. Then, the remaining 1 byte of the control data and the remaining 1 byte of the video data are sequentially loaded, and thus the 0x7E is shown. Next, the remaining 1 byte of the audio data is loaded to a next field.

Figure 1:
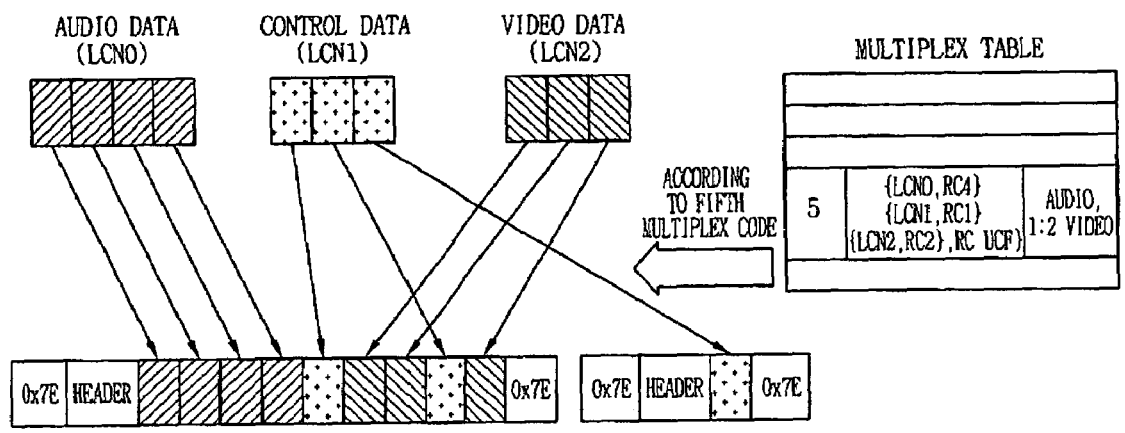
FIG. 1 shows an exemplary view of a method for encoding video call data for a mobile communication terminal in accordance with the related art.

In the present invention, a multiplex code can be selected to be encoded according to the network speed and the byte ratio for the audio data, the control data, and the video data to be substantially transmitted. Therefore, a synchronization inconsistency between the audio data and the video data can be minimized, and a state of the network can be maintained as an optimum state. However, in the related art method shown in FIG. 1, audio data, control data, and video data to be substantially transmitted are encoded by a preset multiplex code.

Figure 4:
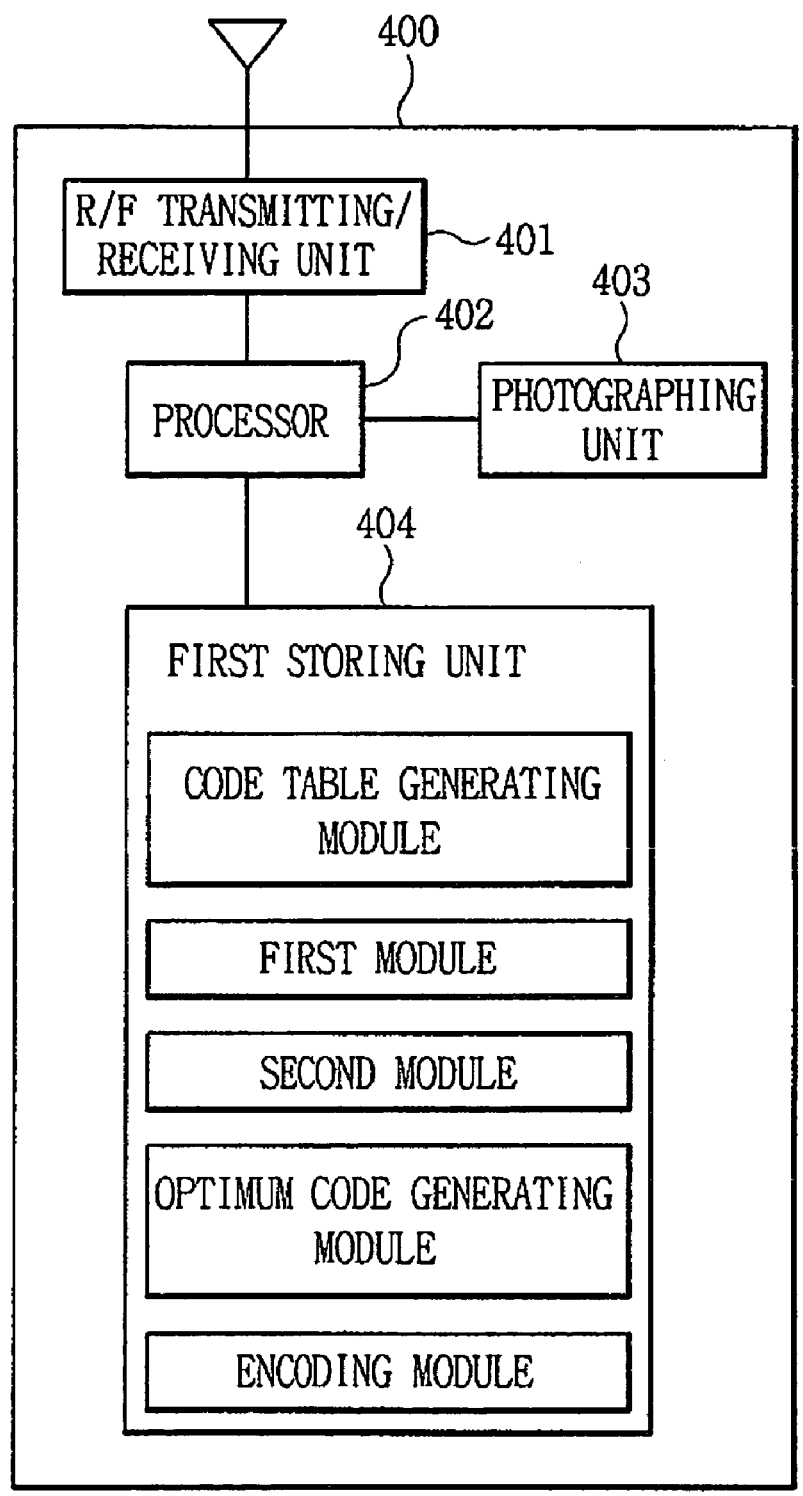
FIG. 4 shows an exemplary view of a mobile communication terminal according to the present invention.

FIG. 4 shows an exemplary view of a mobile communication terminal according to the present invention.

As shown, a mobile communication terminal 400 according to the present invention can comprise an RF signal transmitting/receiving unit 401, a processor 402, a photographing unit 403, a generation module for generating a multiplex code table having a plurality of multiplex codes for multiplexing data a selection module for selecting an optimum multiplex code among the plurality of multiplex codes of the multiplex code table, and an encoding module for encoding data to be transmitted by the selected optimum multiple code. Each of the modules may be included in a first storing unit 404 according to a first embodiment of the present invention.

The mobile communication terminal may further comprise a first module for calculating a byte ratio for each of the multiplex codes of the multiplex table, and a second module for calculating a byte ratio for data to be transmitted. The optimum multiplex code among the plurality of multiplex codes of the multiplex table can be selected by comparing a result from the first module with a result from the second module.

The mobile communication terminal may further comprise a third module for determining a payload size of a multiplex info field according to a state of the network. In this case, the second module can be performed according to a determined payload size of a multiplex info field.

The mobile communication terminal may further comprise a second storing unit between the RF transmitting/receiving unit and the processor. Preferably, the second storing unit is constructed as a buffer memory of a high speed.

Also, the present invention provides a mobile communications terminal comprising: a transceiver to transmit and receive signals and data with a network; an image capture unit to obtain videos and images; a memory to store a plurality of multiplex codes; and a processor cooperating with the transceiver, the image capture unit, and the memory to calculate a byte ratio for data to be transmitted via the transceiver when performing a multimedia call function using the image capture unit, to select a multiplex code from the memory having a nearest byte ratio to the calculated byte ratio, encoding the data to be transmitted by using the selected multiplex code, and transmitting the encoded data to achieve the multimedia call function.

As aforementioned, in the present invention, a byte ratio for audio data, control data, video data to be substantially transmitted are calculated at the time of a video calling, and then a multiplex code having the nearest byte ratio to the calculated byte ratio is selected from the multiplex codes of the multiplex table thus to be encoded. Therefore, a synchronization inconsistency between the audio data and the video data can be decreased, and a network state can be maintained as an optimum state.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for encoding video call data for transmission at a time of a video call using a mobile communication device, the method comprising:
   reading video call data using an RF signal receiving unit;
   determining a payload size of a multiplex information field for the video call data based on network speed, constructing a byte pattern table for each multiplex code of a preset multiplex code table having a plurality of multiplex codes after determining the payload size of the multiplex information field, calculating a byte ratio for each of the multiplex codes of the multiplex code table using the byte pattern table, and calculating a byte ratio for the video call data using a generation module;
   selecting a multiplex code having a nearest byte ratio to the calculated byte ratio from the multiplex code table using a selection module; and
   encoding the video call data based on by using the selected multiplex code using an encoding module.

2. The method of claim 1, wherein the video call data includes audio data, control data, and video data.

3. The method of claim 1, wherein selecting the multiplex code comprise selecting a multiplex code having a nearest byte ratio to the byte ratio of data to be transmitted is selected.

4. The method of claim 3, wherein the nearest byte ratio is a smallest difference value between a byte ratio of a multiplex code and the byte ratio of the data to be transmitted.

5. The method of claim 1, further comprising selecting a multiple code having a nearest byte ratio to the byte ratio of the video call data.

6. A method for performing a video call for a mobile communication terminal, comprising:
   constructing a multiplex code table having a plurality of multiplex codes for multiplexing data;
   selecting an optimum multiplex code among the plurality of multiplex codes of the multiplex table;
   encoding data to be transmitted by the selected multiplex code; and
   transmitting the encoded data.

7. The method of claim 6, wherein the data includes audio data, control data, and video data.

8. The method of claim 6, wherein the step of selecting an optimum multiplex code from the multiplex table comprises:
   calculating a first byte ratio for each multiplex code provided in the multiplex code table;
   calculating a second byte ratio for the data to be transmitted; and comparing the first byte ratio with the second byte ratio, wherein a multiplex code having a first byte ratio nearest to the second byte ratio is selected.

9. The method of claim 8, wherein the first byte ratio nearest to the second byte ratio has a smallest difference value between the first byte ratio and the second byte ratio.

10. The method of claim 9, wherein the difference value is obtained by multiplying the first byte ratio and the second byte ratio by a finite number.

11. The method of claim 8, wherein in the step of comparing, the first byte ratio is rounded off, and then is compared with the second byte ratio.

12. The method of claim 8, wherein in the step of comparing, the first byte ratio is rounded up to an integer value, and then is compared with the second byte ratio.

13. The method of claim 8, further comprising determining a payload size of a multiplex info field according to a network state, and in the step of calculating a second byte ratio, the second byte ratio is calculated according to the determined payload size of a multiplex info field.

14. A mobile communication terminal comprising a transmitting unit, a photographing unit, and an outputting unit, the mobile communication terminal, comprising:
a generation module for generating a multiplex code table having a plurality of multiplex codes for multiplexing data;
a selection module for selecting an optimum multiplex code among the plurality of multiplex codes of the multiplex table;
an encoding module for encoding data to be transmitted by the selected optimum multiplex code; and
a processor for executing each of the modules.

15. The terminal of claim 14, wherein the data includes audio data, control data, and video data.

16. The terminal of claim 14, wherein the generation module, the selection module, and the encoding module are stored in a first storing unit.

17. The terminal of claim 14, further comprising:
a first module for calculating a byte ratio for each of the multiplex codes of the multiplex code table; and
a second module for calculating a byte ratio for the data to be transmitted, wherein the optimum multiplex code among the plurality of multiplex codes of the multiplex table is selected by comparing a result from the first module with a result from the second module.

18. The terminal of claim 14, further comprising:
a third module for determining a payload size of a multiplex info field according to a network state, wherein the second module is performed according to a determined payload size of a multiplex info field.

19. The terminal of claim 14, further comprising a second storing unit for temporarily storing data to be transmitted or received.

20. The terminal of claim 19, wherein the second storing unit is constructed as a buffer memory of a high speed.

21. A mobile communications terminal comprising:
a transceiver to transmit and receive signals and data with a network;
an image capture unit to obtain videos and images;
a memory to store a plurality of multiplex codes; and
a processor cooperating with the transceiver, the image capture unit, and the memory to calculate a byte ratio for data to be transmitted via the transceiver when performing a multimedia call function using the image capture unit, to select a multiplex code from the memory having a nearest byte ratio to the calculated byte ratio, to encode the data to be transmitted by using the selected multiplex code, and to transmit the encoded data to achieve a multimedia call function.

* * * * *